Nov. 25, 1941.  P. F. SPERRY  2,263,934
AUTOMOBILE HEATING DEVICE
Filed May 7, 1937   2 Sheets-Sheet 1
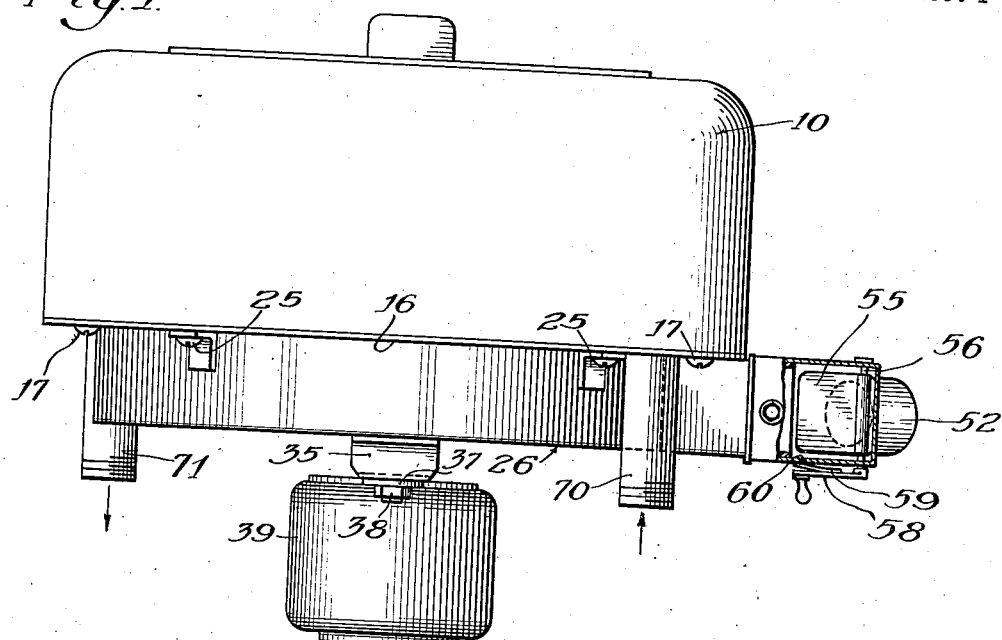
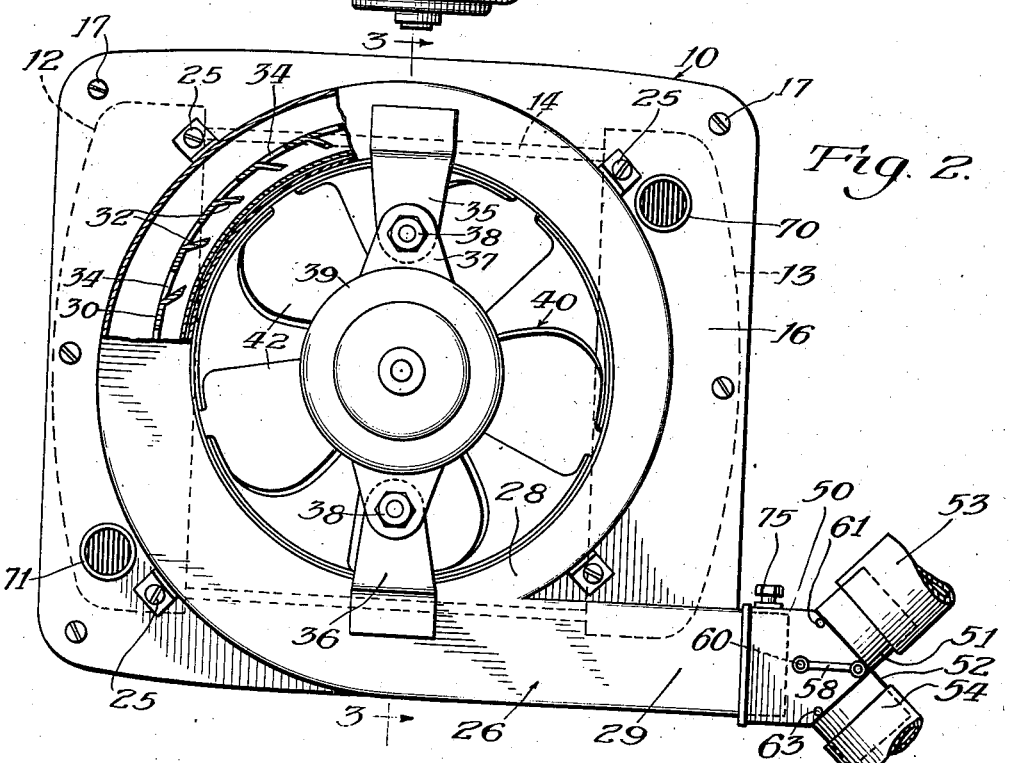
Inventor:
Philmore F. Sperry.
By: Zabel, Carlson, Fitzbaugh & Wells
Attorneys

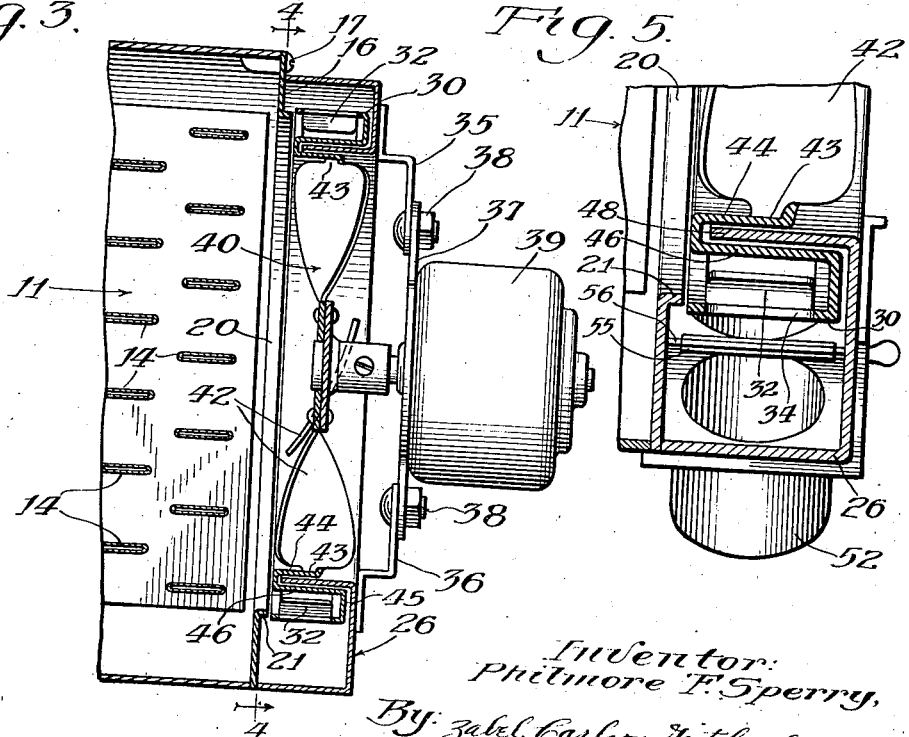

Patented Nov. 25, 1941

2,263,934

UNITED STATES PATENT OFFICE 2,263,934

AUTOMOBILE HEATING DEVICE

Philmore F. Sperry, Chicago, Ill., assignor to Excel Auto Radiator Company, Chicago, Ill., a corporation of Delaware Application May 7, 1937, Serial No. 141,312

4 Claims. (Cl. 257—137)

The invention relates to automobile heating devices and has for its primary object the provision of an automobile heater having improved means for distributing the heated air.

One form of the invention is embodied in an automobile heater which comprises a radiator unit through which the heated cooling fluid for the engine circulates, a fan being provided to advance air through the radiator unit and thence into the interior of the automobile. The fan carries an auxiliary fan at its periphery, the auxiliary fan being in the form of an annulus having a plurality of blades which draw heated air from the interior of the radiator unit and discharge it through a conduit. Means is provided whereby the air discharged through the conduit may be divided into two streams, one of which goes to defrosters associated with the windshield of the automobile and the other of which goes to a foot warmer. Means is provided whereby the stream of air going to the foot warmer may be deflected to the defrosters or whereby the air passing to the defrosters may be deflected to the foot warmer. The means connecting the conduit to the defrosters and the foot warmer preferably comprises a closure member adjustably mounted on the discharge end of the conduit and provided with outlet openings which are connected to the defrosters and the foot warmer by flexible tubing, or the equivalent.

Other objects and advantages will become apparent as the following detailed description progresses, reference being had to the accompanying drawings, wherein—

Fig. 1 is a plan view of the automobile heater which embodies the invention.

Fig. 2 is a rear elevation of the improved automobile heater, part of the heater being shown in section to illustrate certain features of its construction.

Fig. 3 is a section taken on line 3—3 of Fig. 2.

Fig. 4 is a section taken on line 4—4 of Fig. 3, and

Fig. 5 is an enlarged fragmentary section taken on substantially the same line as Fig. 3.

Referring to the drawings wherein a preferred form of the invention is illustrated, the reference character 10 designates generally the housing of an automobile heater, the housing preferably is made from sheet metal. Disposed within the housing 10 is a radiator unit 11 which comprises spaced tanks 12 and 13 which communicate with each other through a plurality of flattened tubes 14.

The rear end of the housing 10 is closed by a plate 16 which is secured to the housing 10 by screws 17. The plate 16 has a large central opening 20, the plate 16 being provided with an annular rearwardly extending flange 21 which encircles the opening 20. It will be noted that the diameter of the opening 20 is approximately equal to the height of the tanks 12 and 13.

Secured to the outer rear surface of the plate 16 by screws 25 is a conduit 26 preferably formed from sheet metal, the plate 16 co-operating to form one face of the complete conduit, which is effectively closed about its entire periphery except for an annular opening adjacent to the radiator core. It will be noted that the conduit 26 is formed in such manner that it tapers from a narrow end 28 to a large discharge end 29 which is preferably square in cross-section. One portion of the conduit 26 is disposed around the opening 20 in such manner that the flange 21 is aligned with an annulus or ring 30 which is formed from sheet metal and has a plurality of fan blades or vanes 32 stamped from it. As best shown in Figs. 2, 3 and 5, apertures 34 are left in the ring 30 when the vanes 32 are stamped inwardly from it and it will be readily understood that air may be advanced through the apertures 34. The ring 30 is mounted for rotation within the conduit 26 by means hereinafter described. Secured to the rear wall of the conduit 26 are brackets 35 and 36 to which a bracket 37 is secured by bolts 38. Mounted on the bracket 37 is an electric motor 39 and mounted upon the shaft of the motor is a fan designated generally by the reference character 40. As best shown in Figs. 2 and 4, the fan 40 comprises a plurality of fan blades 42 which, at their outer ends, are provided with tips or lugs 43. The tips or lugs 43 are welded or otherwise secured to a ring 44 which is part of an annulus designated generally by the reference character 45. The annulus 45 also comprises the ring 30 and a ring 46 disposed intermediate the rings 44 and 30. The annulus 45 is substantially S-shaped in cross-section as best shown in Fig. 5 and it will be noted that the inner wall 48 of the circular part of the conduit 26 is disposed between the flanges 44 and 46 which provide in effect an annular groove opening outwardly away from the radiator core for receiving such wall portion 48. In this arrangement, the structure comprising the plates 44, 48 and 46 effectively separates from each other the zones in which the two fans are effective.

The construction is such that when the motor 39 is in operation, the fan 40 will rotate and will carry the annulus 45 with it so that the vanes 32 will withdraw heated air from the radiator unit or core 11 and advance it through the conduit 26. The fan 40 will advance air to the left (Fig. 3) through the radiator unit or core 11 and there will be an exchange of heat between the fluid in the tubes 14 and the air. The heated air is discharged into the interior of the automobile in a manner well known to those skilled in the art. The vanes or blades 32 will create simultaneously, a partial vacuum in the space between the rings 30 and 46 and will cause heated air to be drawn from the unit or core 11 into the space into which the vanes project and this heated air will be driven by the vanes 32 through the apertures 34 so that a pressure will be built up in the conduit 26. Of course, the result is that heated air is discharged from the conduit 26. It will be noted that the air advanced by the fan 40 travels in one direction through the core 11 and that the air advanced by the vanes 32 is drawn in the opposite direction through the core 11.

Adjustably mounted upon the squared discharge end of the conduit 26 is a closure or cap member 50 having short tubes 51 and 52 projecting therefrom. Secured to the discharge ends of the tubes 51 and 52 are flexible tubes 53 and 54, respectively. The tube 53 may be connected to defrosters (not shown) disposed adjacent the windshield of the automobile. The tube 54 may be connected to a foot warmer for the driver or his companion.

It will be readily understood that the heated air, when discharged from the conduit 26, may pass through the tubes 53 and 54 to be defrosters and the foot warmer (not shown). Disposed within the closure or cap member 50 is a vane or valve 55 carried upon a pin 56 pivoted in the walls of the closure or cap member 50. The vane or valve 55 may be brought into a position wherein it closes the opening into the tube 51, it may be brought into a position (as shown) where it does not close either opening of the tubes 51 and 52 and it may be brought into a position wherein it closes the opening into the tube 52. Obviously, if the opening into the tube 51 is closed, no heated air will be supplied to the defrosters (not shown) and likewise, when the valve 55 closes the opening into the tube 52, no heated air will be supplied to the foot warmer 54. However, when the valve 55 is in its intermediate position as shown in Fig. 1, heated air is supplied to both the defrosters and the foot warmer (not shown). The valve is controlled by a lever 58 fixed to the pin 56 at one end thereof. A spring 59 carried by the lever 58 has a projection 60 engageable with recesses 61, 62 and 63 formed in one of the walls of the closure or cap member 50, the construction being such that when the projection 60 is in engagement with one of the recesses 61, 62 or 63, the valve 55 will be held yieldingly in a corresponding position. When the projection 60 engages the recess 62, as illustrated in Fig. 1, heated air may flow through the tubes 51 and 52. When the projection 60 engages the recess 61, the valve 55 closes the opening into the tube 51 and when the projection 60 engages the recess 63, the valve 55 closes the opening into the tube 52.

An inlet pipe 70 projects through the plate 16 and communicates with the tank 13. An outlet pipe 71 also projects through the plate 16 and communicates with the tank 12. The pipes 70 and 71 are connected, preferably, to the cooling system of the automobile by means (not shown) in a manner well known in the art. The heated fluid from the cooling system circulates through the core 11 as indicated above so that when the motor 39 is in operation, the fan 40 will push air through the core 11 to heat the interior of the automobile. Simultaneously, the fan comprising the vanes 32 will draw air through the core 11 to discharge it into the conduit 26 from which it may be distributed through the tubes 51 and 52 which are controlled by the valve 55. It will be noted that the area through which air is drawn or pulled by the vanes 32 lies outside and surrounds the area through which the air is advanced or pushed through the core 11.

The closure or cap member 50 is provided with means for securing it in adjusted positions upon the end of the conduit 26. This means preferably comprises a set-screw 75. It will be noted that as shown in Figs. 1 and 2, the longitudinal axes of the tubes 51 and 52 lie in a vertical plane and it will be readily understood that the set-screw 75 may be manipulated to permit withdrawal of the member 50 from the conduit 26 so that it may be rotated through 180 degrees in either direction and then replaced upon the end of the conduit 26. This construction is advantageous as it permits the cap to be brought into a position wherein the tubes 53 and 54 may be connected conveniently to the tubes 51 and 52.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:

1. A heat exchange device of the kind described, comprising a radiator core, an electric motor, a fan operatively connected with said motor adjacent to one of the faces of said core having outwardly extending blades adapted upon rotation of the fan to drive air through the core longitudinally of the axis of the fan, a ring extending about said fan connected directly with the blades thereof and having an annular groove in the face disposed outwardly away from the radiator core, said ring being provided with vanes in spaced relation to each other with openings between the vanes adapted upon rotation of the ring to cause air to move outwardly away from the axis of the ring, and conduit means substantially surrounding said ring with one edge portion extending into the groove of the ring and having an effective opening toward the radiator core for causing the air entering the conduit to pass first through the core.

2. A heat exchange device of the kind described, comprising a radiator core, an electric motor, a fan operatively connected with said motor adjacent to one of the faces of said core having outwardly extending blades adapted upon rotation of the fan to drive air through the core longitudinally of the axis of the fan, a ring formed of sheet metal of substantially S-form in cross-section, means for connecting the inner ply of said ring with the blades of said first named fan, vanes carried by the outer ply of said ring in spaced relation to each other with openings between the vanes adapted upon rotation of the ring to cause air to move outwardly away from the axis of the ring, and conduit means substantially surrounding said ring with one edge portion extending into the groove between the inner ply and the intermediate ply of said ring and having an effective opening toward the radiator core for causing the air entering the conduit to pass first through the core.

3. A heat exchange device of the kind described comprising a radiator core, an electric motor, a fan driven by the electric motor for pushing air through said core, a ring shaped member carried by said fan at the periphery thereof, a circular fan member carried by said ring member and being disposed around and spaced from said ring member, said circular fan member being provided with vanes for drawing air through said core in a direction opposite to that in which the air is advanced through the core by the first mentioned fan, a conduit in which said circular fan member rotates having an opening toward the core and closed at the side away from the core, said conduit cooperating with said ring member to separate the zones in which said two fans are effective, and means for connecting the conduit to means to be supplied with air drawn from said core by said vanes.

4. A heat exchange device of the kind described, comprising a radiator core, an electric motor, a fan driven by said motor for pushing air through said core, a sheet metal ring extending around the blades of said fan in outwardly spaced relation thereto, means rigidly connecting the ring with the fan and separating the ring from the zone of influence of the fan, a series of vanes formed integrally with said ring in spaced relation to each other about the ring and positioned for drawing air freely through said radiator core independently of said first-named fan and in the opposite direction from that in which the air is driven by said first-named fan, and a conduit extending about said vanes so as to have effective cooperation with the vanes for conducting away the air drawn through the core by said vanes.

PHILMORE F. SPERRY.